(12) United States Patent
Bani Shamseh

(10) Patent No.: US 12,362,659 B2
(45) Date of Patent: Jul. 15, 2025

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventor: Mohammad Bani Shamseh, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 71 days.

(21) Appl. No.: 17/760,330

(22) PCT Filed: Feb. 1, 2021

(86) PCT No.: PCT/JP2021/003587
§ 371 (c)(1),
(2) Date: Aug. 8, 2022

(87) PCT Pub. No.: WO2022/162948
PCT Pub. Date: Aug. 4, 2022

(65) Prior Publication Data
US 2023/0071413 A1    Mar. 9, 2023

(51) Int. Cl.
*H02M 1/36* (2007.01)
*H02M 7/53* (2006.01)

(52) U.S. Cl.
CPC .............. *H02M 1/36* (2013.01); *H02M 7/53* (2013.01)

(58) Field of Classification Search
CPC ........ H02M 7/53; H02M 7/533; H02M 7/537; H02M 7/5375; H02M 7/515; H02M 7/42; H02M 1/36; H02M 1/38
See application file for complete search history.

(56) References Cited

U.S. PATENT DOCUMENTS

| | | | |
|---|---|---|---|
| 2008/0291588 A1* | 11/2008 | Kanai | H02H 7/0838 361/23 |
| 2016/0156295 A1* | 6/2016 | Kaidu | H02P 6/20 318/400.11 |
| 2019/0195923 A1 | 6/2019 | Ohori et al. | |

FOREIGN PATENT DOCUMENTS

| | | |
|---|---|---|
| EP | 3 176 939 B1 | 11/2018 |
| JP | 60-141123 A | 7/1985 |
| TW | 201742363 A | 12/2017 |

OTHER PUBLICATIONS

International Preliminary Report on Patentability and Written Opinion issued Aug. 10, 2023 in PCT/JP2021/003587 (submitting English Translation only), 5 pages.

(Continued)

*Primary Examiner* — Nguyen Tran
(74) *Attorney, Agent, or Firm* — Oblon, McClelland, Maier & Neustadt, L.L.P.

(57) ABSTRACT

A power conversion device according to one embodiment has an inverter that converts direct-current power supplied from a direct-current power source to alternating-current power, a determination unit that determines whether or not a negative-phase sequence voltage on an alternating-current side of the inverter is a predetermined value or greater, and a stop control unit that performs control to stop the inverter in a case where the determination unit determines that the negative-phase sequence voltage is the predetermined value or greater. Further, the stop control unit may perform control to stop the inverter in a case where a positive-phase sequence voltage on the alternating-current side of the inverter is within a predetermined range.

1 Claim, 6 Drawing Sheets

(56) References Cited

OTHER PUBLICATIONS

International Search Report and Written Opinion mailed on Mar. 30, 2021 in PCT/JP2021/003587 filed on Feb. 1, 2021 (10 pages, with English Translation of International Search Report).
Notice of Reasons for Refusal dated Jul. 5, 2022 in Japanese Application 2021-56176 filed on Jun. 24, 2022 (2 pages).
Chihiro Okado, and three other persons, "A Novel Islanding Protection System for Photovoltaic Inverters", *T. IEE Japan*, vol. 114-B, Nos. 7/8, 1994, pp. 732-738.
Extended European Search Report issued on Sep. 20, 2024 in European Patent Application No. 21922958.0, 10 pages.
Examination Report issued on Sep. 3, 2024 in Indian Patent Application No. 202217044504, 5 pages.
Karimi et al., "Negative-Sequence Current Injection for Fast Islanding Detection of a Distributed Resource Unit", IEEE Transactions On Power Electronics, vol. 23, No. 1, Jan. 2008, pp. 298-307.
Kim et al., "Islanding Detection Method with Negative-Sequence Current Injection under Unbalanced Grid Voltage", 2015 IEEE $2^{nd}$ International Future Energy Electronics Conference (IFEEC), IEEE, Nov. 2015, 6 pages.
Office Action dated May 20, 2025, issued in counterpart EP Application No. 21922958.0. (8 pages).

\* cited by examiner

POWER CONVERSION DEVICE

FIELD

The present invention relates to a power conversion device.

BACKGROUND

A power conversion device (such as a PCS (power conditioning subsystem)) has been known which includes an inverter converting direct-current power supplied from a direct-current power source such as a solar cell to alternating-current power based on a PWM (pulse width modulation) signal.

In such a power conversion device, there is a case where when inverter output power (effective power and reactive power) completely agrees with load power in a case where a circuit breaker on a system side is opened, an inverter performs an operation at a power factor of 100%, a current supplied from the inverter to a load is maintained at a current at a time before an islanding operation occurs, a terminal voltage and a frequency hardly change. Thus, the power conversion device cannot detect that the islanding operation is taking place and may continue the islanding operation.

In a case where an islanding operation is continued, a power conversion device has a problem such as a possibility of an electric shock to a human body, trouble with a machine, or an occurrence of an over current in reclosing. In order to prevent a power conversion device from continuing an islanding operation, it is necessary to detect that the power conversion device is in an islanding operation.

As a method for detecting that a power conversion device is in an islanding operation, for example, a slip mode frequency shift (SMFS) method is present. The slip mode frequency shift method is a method which detects that a power conversion device is in an islanding operation by detecting frequency abnormality by using reactive power (for example, see NPL 1).

CITATION LIST

Non Patent Literature

[NPL 1] Chihiro Okado, and three other persons, "A Novel Islanding Protection System for Photovoltaic Inverters", T. IEE Japan, Vol. 114-B No. 7/8'94, p.732-738

SUMMARY

Technical Problem

However, in recent years, a frequency range in a normal operation of a power conversion device has been expanded, quick detection of an islanding operation has become an issue.

The present invention has been made to solve the above problem, and an object is to provide a power conversion device that can quickly stop an inverter in a case where an islanding operation takes place.

Means for Solving the Problem

According to one aspect of the present invention, a power conversion device comprising: an inverter that converts direct-current power supplied from a direct-current power source to alternating-current power; a determination unit that determines whether or not a negative-phase sequence voltage on an alternating-current side of the inverter is a predetermined value or greater; and a stop control unit that performs control to stop the inverter in a case where the determination unit determines that the negative-phase sequence voltage is the predetermined value or greater.

Also, according to another aspect of the present invention, in the power conversion device, the stop control unit performs control to stop the inverter in a case where a positive-phase sequence voltage on the alternating-current side of the inverter is within a predetermined range.

Advantageous Effects of Invention

In the present invention, an inverter can quickly be stopped in a case where an islanding operation takes place.

DESCRIPTION OF EMBODIMENTS

Figure 6A:
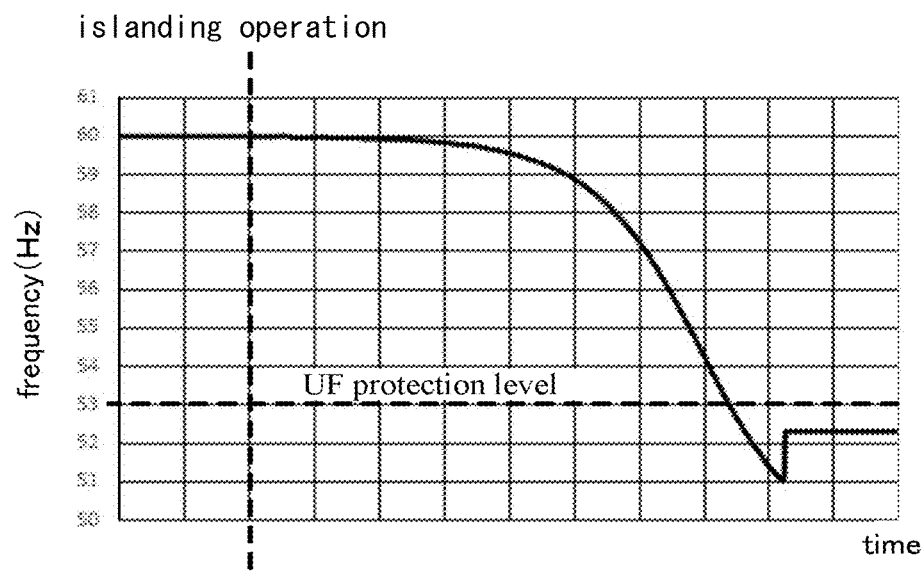
FIG. 6A is a graph illustrating, as an example, a change in frequency in the slip mode frequency shift method.
Figure 6B:
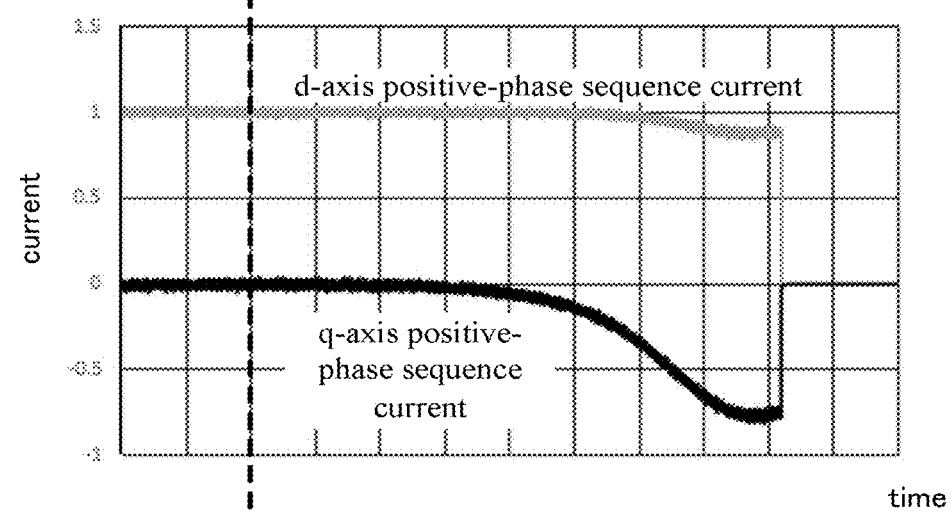
FIG. 6B is a graph illustrating, as an example, the relationship between a d-axis positive-phase sequence current and a q-axis positive-phase sequence current in the slip mode frequency shift method.
Figure 6C:
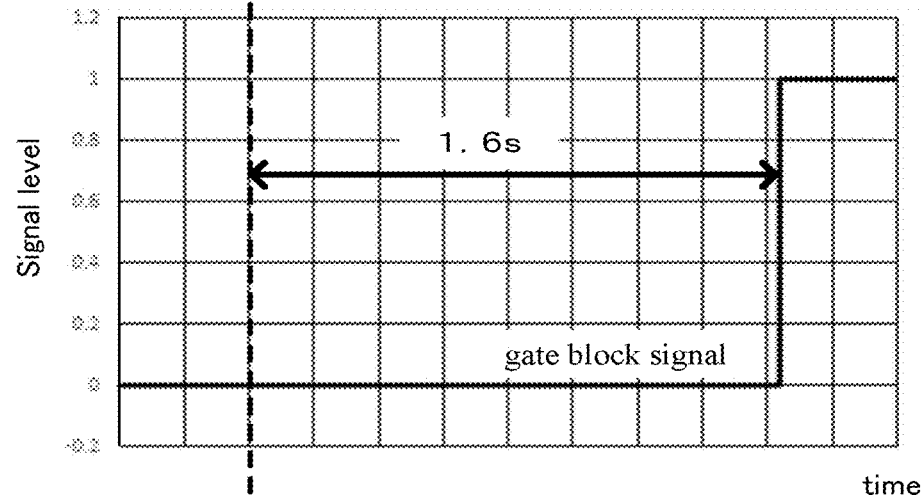
FIG. 6C is a graph illustrating, as an example, a time until a gate block signal for stopping an inverter is output in the slip mode frequency shift method.

First, a more specific description will be made about a background in which the present invention has been made. FIG. 6 depicts graphs illustrating, as an example, results of a stop of an islanding operation of a power conversion device by a slip mode frequency shift method. FIG. 6A is a graph illustrating, as an example, a change in frequency in the slip mode frequency shift method. FIG. 6B is a graph illustrating, as an example, the relationship between a d-axis positive-phase sequence current and a q-axis positive-phase sequence current in the slip mode frequency shift method. FIG. 6C is a graph illustrating, as an example, a time until a gate block signal for stopping an inverter is output in the slip mode frequency shift method.

Here, it is assumed that in a case where the frequency of a power conversion device employing the slip mode frequency shift method is lowered from 60 Hz in a normal operation to 53 Hz (UF protection level) or lower, the inverter is stopped. In the power conversion device employing the slip mode frequency shift method, when the frequency lowers as illustrated in FIG. 6A and becomes 53 Hz or lower, for example, the q-axis positive-phase sequence current of the power conversion device fluctuates as illustrated in FIG. 6B. Note that the d-axis positive-phase sequence current does not largely fluctuates.

As a result, the power conversion device employing the slip mode frequency shift method outputs the gate block signal for the inverter and stops the inverter. The power conversion device employing the slip mode frequency shift method requires 1.6 s as illustrated in FIG. 6C, for example, from an occurrence of the islanding operation to an output of the gate block signal.

Figure 1:
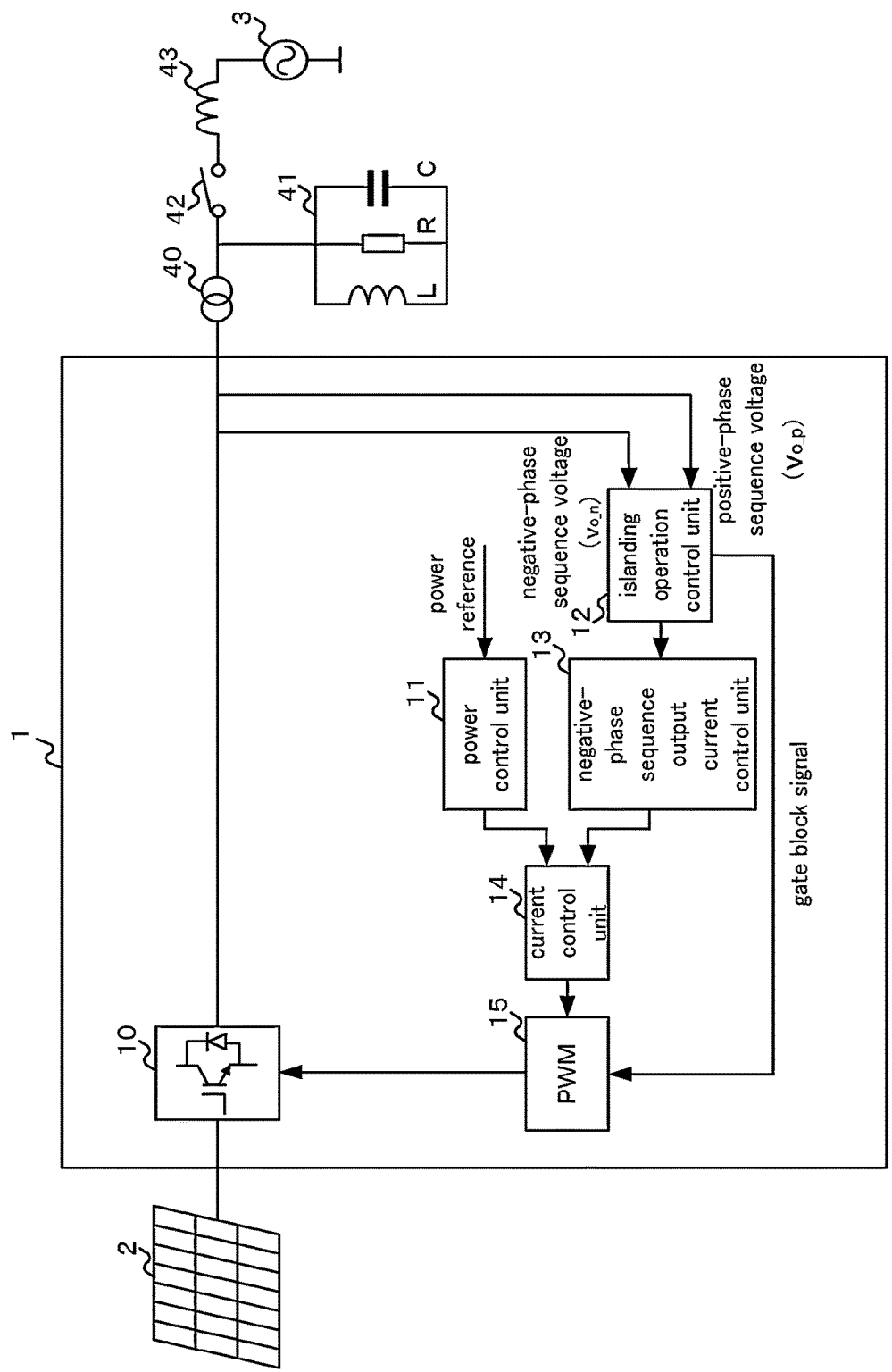
FIG. 1 is a diagram illustrating a power conversion device according to one embodiment and peripheral configurations thereof.

Next, one embodiment of a power conversion device will be described by using drawings. FIG. 1 is a diagram illustrating a power conversion device 1 according to one embodiment and peripheral configurations thereof.

For example, the power conversion device 1 is provided between a direct-current power source 2 and an alternating-current power source (power grid) 3 and converts direct-current power to three-phase alternating-current power. The direct-current power source 2 is a solar cell module or the like, for example. The alternating-current power source 3 is in general referred to as power system.

Between the power conversion device 1 and the alternating-current power source 3, for example, a transformer 40, an RLC load 41, a circuit breaker 42, and an alternating-current reactor 43 are connected.

The power conversion device 1 includes an inverter 10, a power control unit 11, an islanding operation control unit 12, a negative-phase sequence output current control unit 13, a current control unit 14, and a PWM drive circuit 15, for example.

The inverter 10 is interposed between the direct-current power source 2 and the alternating-current power source 3 and forms a series circuit with those. Further, the inverter 10 converts direct-current power supplied from the direct-current power source 2 to alternating-current power based on a PWM signal (described later). Note that the inverter 10 may be a three-phase voltage type inverter circuit including plural semiconductor switching devices, for example.

The power control unit 11 performs control such that effective power and reactive power correspond to preset power references and outputs controlled effective power and reactive power to the current control unit 14.

When a negative-phase sequence voltage ($v_{o\_n}$) and a positive-phase sequence voltage ($v_{o\_p}$) from an output of the inverter 10 are input, the islanding operation control unit 12 outputs a q-axis negative-phase sequence current command ($i_{oq\_n\_ref}$) to the negative-phase sequence output current control unit 13 and outputs a gate block signal to the PWM drive circuit 15. Note that a specific configuration example of the islanding operation control unit 12 will be described later by using FIG. 2.

When the q-axis negative-phase sequence current command ($i_{oq\_n\_ref}$) is input from the islanding operation control unit 12, the negative-phase sequence output current control unit 13 controls a q-axis negative-phase sequence current and outputs that to the current control unit 14.

When the controlled effective power and reactive power are input from the power control unit 11 and the q-axis negative-phase sequence current is input from the negative-phase sequence output current control unit 13, the current control unit 14 outputs a current command value to the PWM drive circuit 15.

The PWM drive circuit 15 generates a pulse width modulation signal (PWM signal) in accordance with the current command value of the current control unit 14. Then, the PWM drive circuit 15 transmits this PWM signal as a drive signal (gate signal) for the semiconductor switching device to the inverter 10.

Figure 2:
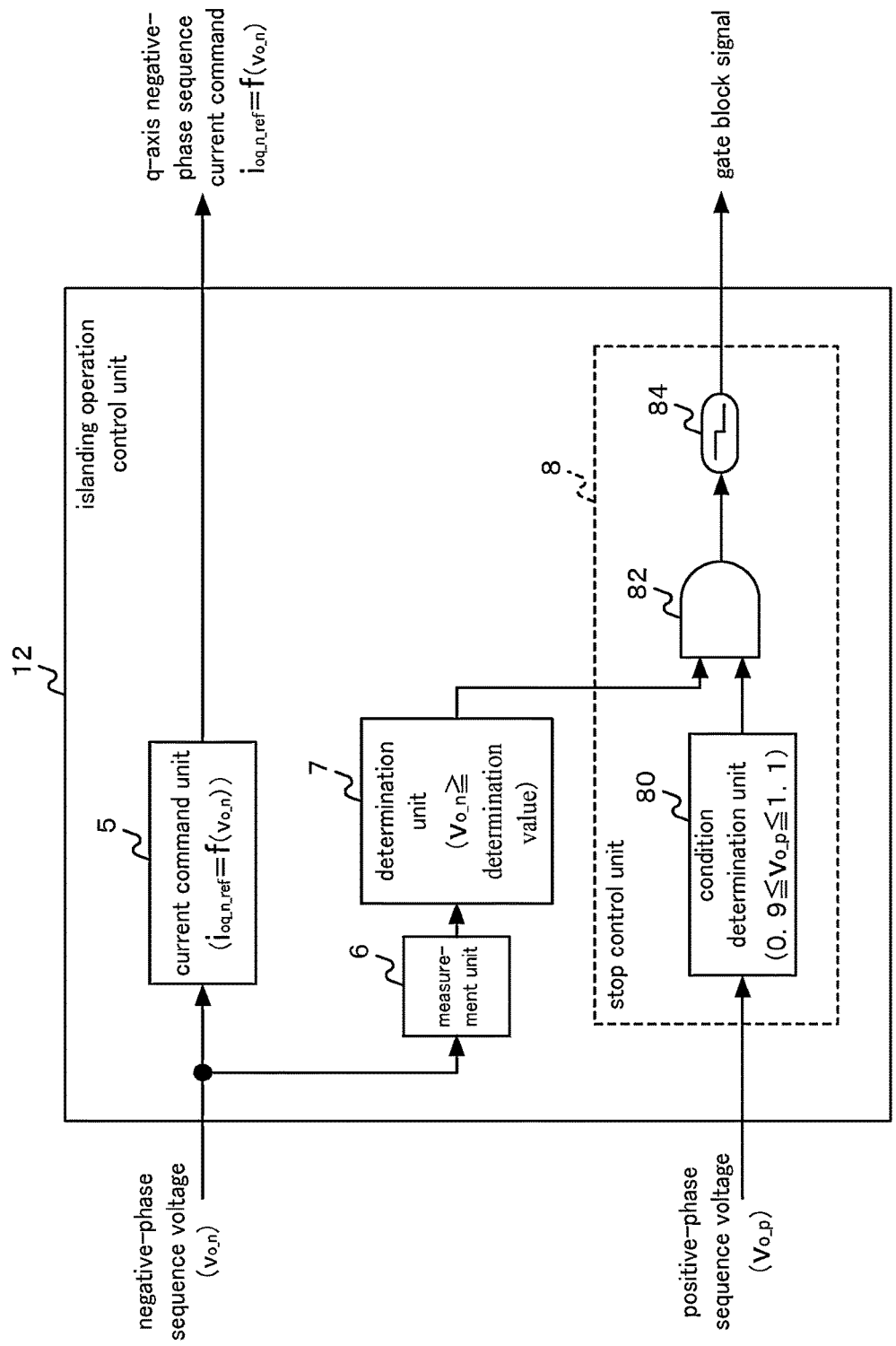
FIG. 2 is a block diagram illustrating a specific configuration example of the islanding operation control unit.

FIG. 2 is a block diagram illustrating a specific configuration example of the islanding operation control unit 12. As illustrated in FIG. 2, the islanding operation control unit 12 includes a current command unit 5, a measurement unit 6, a determination unit 7, and a stop control unit 8, for example.

Figure 3:
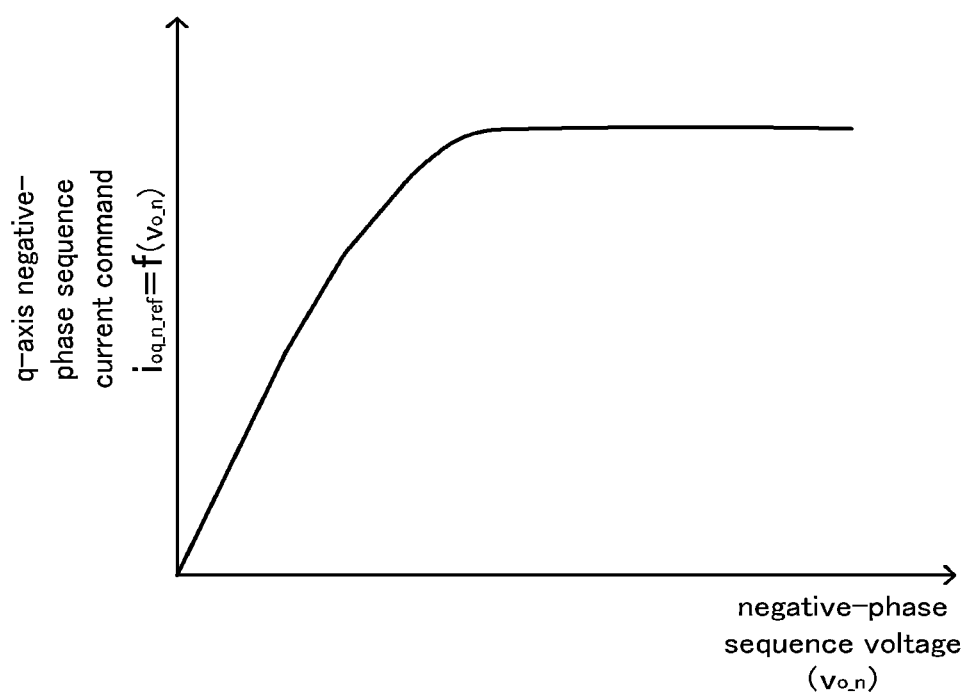
FIG. 3 is a graph showing the relationship between the negative-phase sequence voltage and the q-axis negative-phase sequence current command.

When the negative-phase sequence voltage ($v_{o\_n}$) is input, the current command unit 5 calculates the q-axis negative-phase sequence current command ($i_{oq\_n\_ref}$) and outputs that to the negative-phase sequence output current control unit 13. For example, as illustrated in FIG. 3, the current command unit 5 outputs the q-axis negative-phase sequence current command ($i_{oq\_n\_ref}$) which corresponds to the negative-phase sequence voltage ($v_{o\_n}$).

The measurement unit 6 (FIG. 2) measures the input negative-phase sequence voltage ($v_{o\_n}$) and outputs a measurement result to the determination unit 7.

Figure 4A:
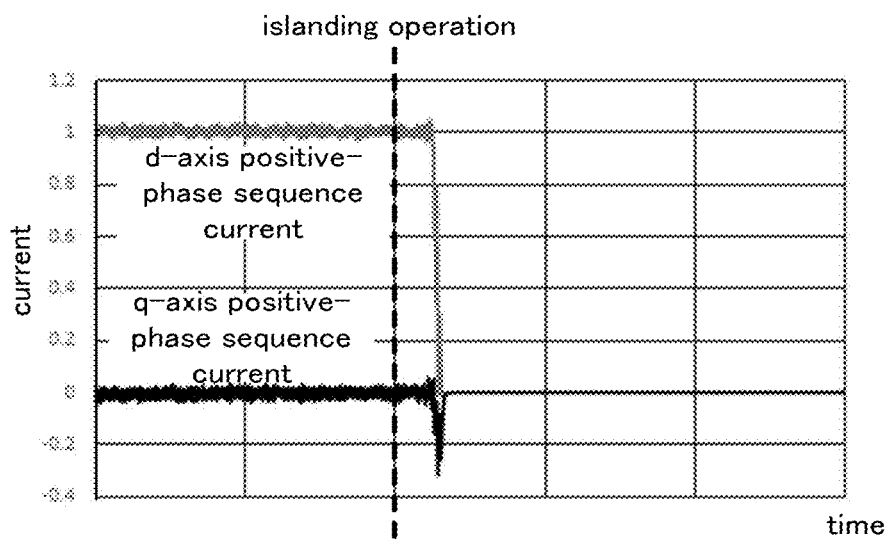
FIG. 4A is a graph illustrating change states of a d-axis positive-phase sequence current and a q-axis positive-phase sequence current.
Figure 4B:
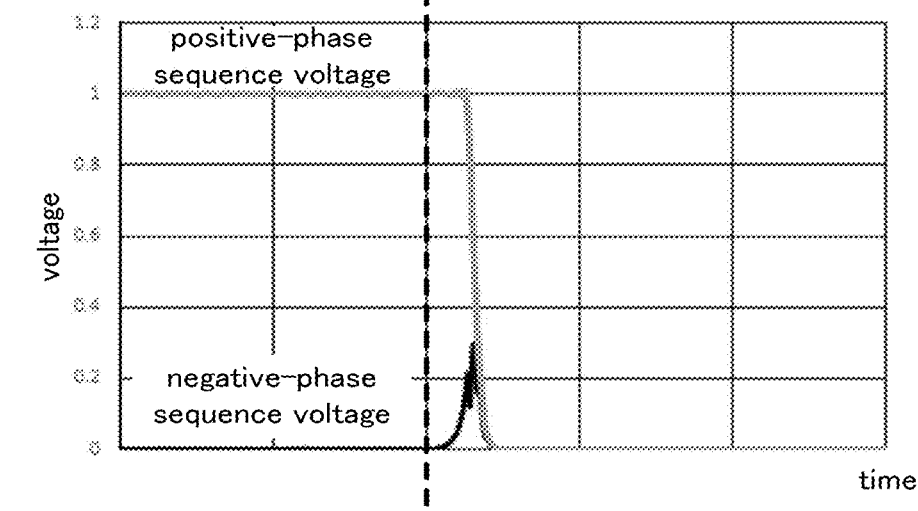
FIG. 4B is a graph illustrating change states of the positive-phase sequence voltage (vo_p) and the negative-phase sequence voltage (vo_n).
Figure 4C:
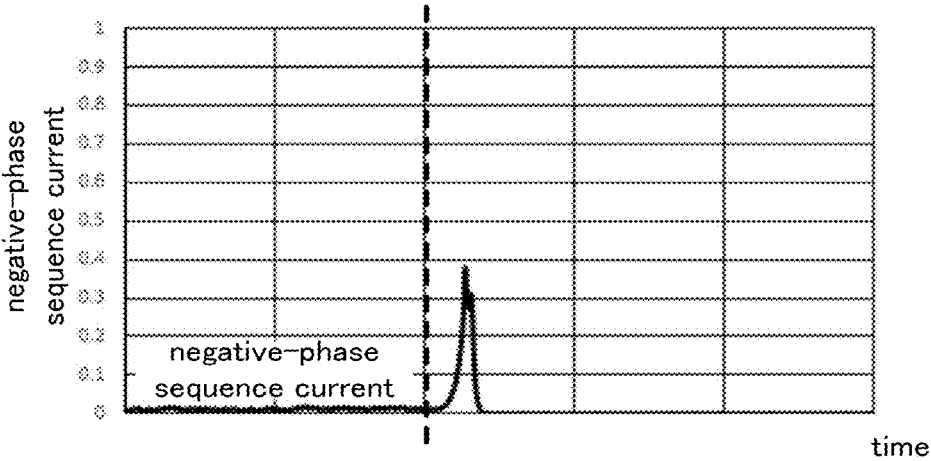
FIG. 4C is a graph illustrating a change state of a negative-phase sequence current.

FIG. 4 depicts graphs illustrating an action state example in a case where the measurement unit 6 measures the negative-phase sequence voltage ($v_{o\_n}$) when the islanding operation takes place. FIG. 4A is a graph illustrating change states of a d-axis positive-phase sequence current and a q-axis positive-phase sequence current. FIG. 4B is a graph illustrating change states of the positive-phase sequence voltage ($v_{o\_p}$) and the negative-phase sequence voltage ($v_{o\_n}$). FIG. 4C is a graph illustrating a change state of a negative-phase sequence current.

As illustrated in FIG. 4A, even when the islanding operation takes place, the d-axis positive-phase sequence current and the q-axis positive-phase sequence current hardly change. As illustrated in FIG. 4B, when the islanding operation takes place, the positive-phase sequence voltage hardly changes, but the negative-phase sequence current changes. As illustrated in FIG. 4C, when the islanding operation takes place, the negative-phase sequence current increases.

In this case, when the negative-phase sequence voltage slightly rises, the inverter 10 injects the negative-phase sequence current, and the negative-phase sequence voltage further rises. The negative-phase sequence voltage increases as the negative-phase sequence current increases, and the increase in the negative-phase sequence voltage causes a further increase in the negative-phase sequence current.

The determination unit 7 determines whether or not the negative-phase sequence voltage ($v_{o\_n}$) measured by the measurement unit 6 becomes a determination value defined in advance or greater and outputs a determination result to the stop control unit 8. In other words, the determination unit 7 determines whether or not the negative-phase sequence voltage on an alternating-current side of the inverter 10 is a predetermined value or greater.

The stop control unit 8 includes a condition determination unit 80, a logical product circuit 82, and a delay element 84 and performs control for the PWM drive circuit 15. For example, in a case where the determination unit 7 determines that the negative-phase sequence voltage is a predetermined value or greater, the stop control unit 8 performs control to stop the inverter 10.

Specifically, the condition determination unit 80 determines whether or not the input positive-phase sequence voltage ($v_{o\_p}$) is 0.9 $v_{o\_p}$ 1.1, for example, and outputs a determination result to the logical product circuit 82. In other words, the condition determination unit 80 does not make a determination about an imbalance operation status (unbalanced short-circuit) but determines whether or not the positive-phase sequence voltage falls within a normal range.

Consequently, in a case where the positive-phase sequence voltage on the alternating-current side of the inverter 10 is within a predetermined range, the stop control unit 8 performs control to stop the inverter 10.

In a case where the determination unit 7 determines that the negative-phase sequence voltage is a predetermined value or greater and the condition determination unit 80 determines that the positive-phase sequence voltage ($v_{o\_p}$) is $0.9 \leq v_{o\_p} \leq 1.1$, for example, the logical product circuit 82 outputs the gate block signal for the PWM drive circuit 15.

The delay element 84 is an element that gives a delay to stabilize a control action and gives a delay of several milliseconds, for example.

Consequently, in a case where the islanding operation occurs, the power conversion device 1 raises the negative-phase sequence voltage by injecting the negative-phase sequence current based on the positive-phase sequence voltage ($v_{o\_p}$) and the negative-phase sequence voltage ($v_{o\_n}$) and can thereby rapidly stop the inverter 10.

Figure 5:
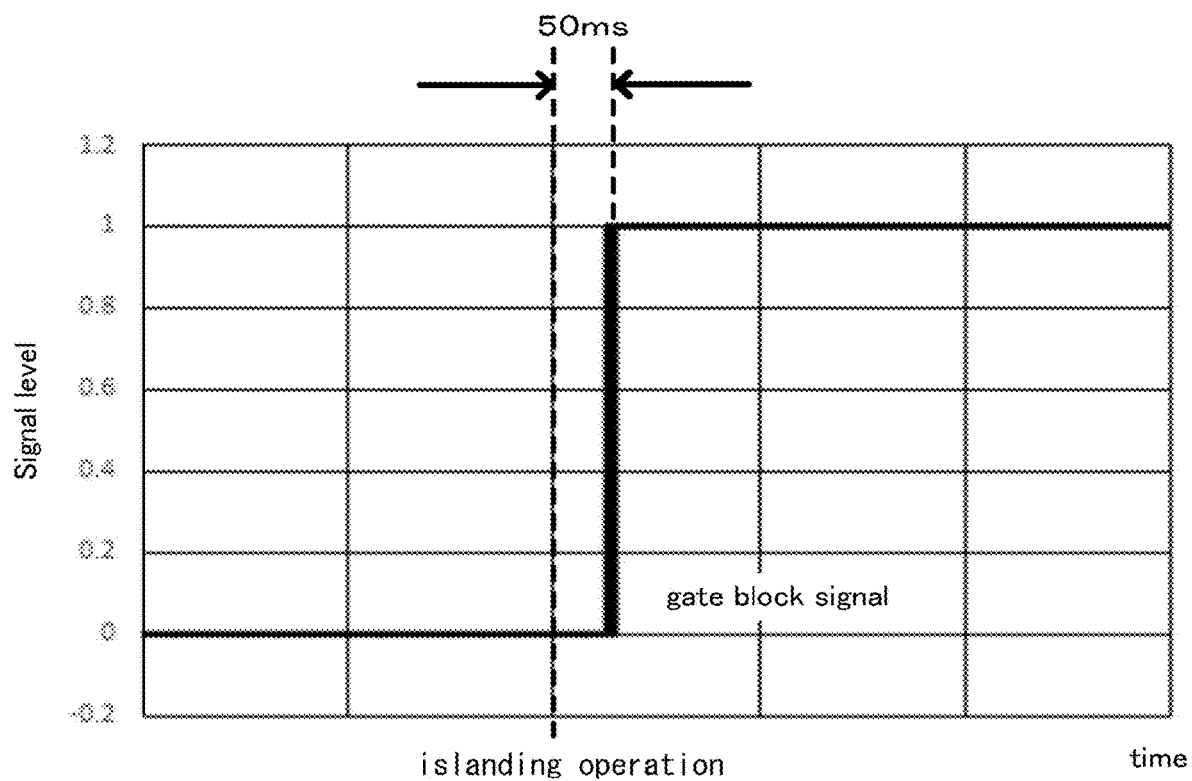
FIG. 5 is a graph illustrating, as an example, a time taken before the power conversion device 1 according to one embodiment stops the inverter 10.

FIG. 5 is a graph illustrating, as an example, a time taken before the power conversion device 1 according to one embodiment stops the inverter 10. As illustrated in FIG. 5, in the power conversion device 1, the islanding operation control unit 12 can output the gate block signal to the PWM drive circuit 15 in a time of 50 ms after the islanding operation takes place.

As described above, the power conversion device 1 according to one embodiment includes the islanding operation control unit 12 that performs control to stop the inverter 10 in a case where the determination unit 7 determines that the negative-phase sequence voltage is a predetermined value or greater and can thus quickly stop the inverter in a case where the islanding operation takes place.

Note that as for each function of control performed by the power conversion device 1, a portion or whole of the function may be configured with hardware such as a PLD (programmable logic device) or an FPGA (field programmable gate array) or may be configured as a program that is executed by a processor such as a CPU.

Furthermore, control performed by the power conversion device 1 according to the present invention can be realized by using a computer and a program, and it is possible to record the program in a storage medium and to provide the program through a network.

REFERENCE SIGNS LIST 1 power conversion device
2 direct-current power source
3 alternating-current power source
5 current command unit
6 measurement unit
7 determination unit
8 stop control unit
10 inverter
11 power control unit
12 islanding operation control unit
13 negative-phase sequence output current control unit
14 current control unit
15 PWM drive circuit
40 transformer
41 RLC load
42 circuit breaker
43 alternating-current reactor
80 condition determination unit
82 logical product circuit
84 delay element

The invention claimed is:

1. A power conversion device comprising:
an inverter that converts direct-current power supplied from a direct-current power source to alternating-current power;
a determination unit that determines whether or not a negative-phase sequence voltage on an alternating-current side of the inverter is a predetermined value or greater; and
a stop control unit that performs control to stop the inverter by raising the negative-phase sequence voltage by injecting a negative-phase sequence current in a case where the determination unit determines that the negative-phase sequence voltage is the predetermined value or greater and a positive-phase sequence voltage on the alternating-current side of the inverter is within a normal range.

* * * * *